United States Patent
Jaynes et al.

(10) Patent No.: US 7,097,311 B2
(45) Date of Patent: Aug. 29, 2006

(54) SUPER-RESOLUTION OVERLAY IN MULTI-PROJECTOR DISPLAYS

(75) Inventors: Christopher O. Jaynes, Lexington, KY (US); Divya T. Ramakrishnan, Madras (IN)

(73) Assignee: University of Kentucky Research Foundation, Lexington, KY (US)

( * ) Notice: Subject to any disclaimer, the term of this patent is extended or adjusted under 35 U.S.C. 154(b) by 150 days.

(21) Appl. No.: 10/827,176

(22) Filed: Apr. 19, 2004

(65) Prior Publication Data

US 2004/0239885 A1   Dec. 2, 2004

Related U.S. Application Data

(60) Provisional application No. 60/464,218, filed on Apr. 19, 2003.

(51) Int. Cl.
| | |
|---|---|
| G03B 21/00 | (2006.01) |
| G03B 21/14 | (2006.01) |
| G03B 21/26 | (2006.01) |
| H04N 5/64 | (2006.01) |
| H04N 9/28 | (2006.01) |

(52) U.S. Cl. .......................... 353/122; 353/30; 353/31; 353/69; 353/70; 353/94; 353/121; 348/744; 348/745; 348/807

(58) Field of Classification Search ................... 353/30, 353/31, 69, 70, 94, 121, 122; 348/744, 745, 348/807
See application file for complete search history.

(56) References Cited

U.S. PATENT DOCUMENTS

| | | | |
|---|---|---|---|
| 6,483,555 B1 * | 11/2002 | Thielemans et al. | 348/745 |
| 2002/0063807 A1 | 5/2002 | Margulis | 348/745 |

OTHER PUBLICATIONS

M. Elad and A. Feuer, "Restoration of Single Super-Resolution Image from Several Blurred, Noisy and Under Sampled Measured Images," *IEEE Transactions on Image Processing*, vol. 6, No. 12, pp. 1646-1658 (Dec. 1997); {labeled "ATTACHMENT C" of applicants' provisional app. filed in Apr. 2003 as background information}.

A. Majumder and G. Welch, "Computer Graphics Optique: Optical Superposition of Projected Computer Graphics," *Fifth Immersive Projection Technology Workshop, Seventh Eurographics Workshop on Virtual Environments*, Stuttgart, Germany Springer-Verlag (May 2001) 8 pages {labeled "ATTACHMENT D" of applicants' provisional appl filed in Apr. 2003}.

(Continued)

*Primary Examiner*—Melissa Jan Koval
(74) *Attorney, Agent, or Firm*—Macheledt Bales & Heidmiller LLP

(57) ABSTRACT

A technique, associated system and computer executable program code, for projecting a superimposed image onto a target display surface under observation of one or more cameras. A projective relationship between each projector being used and the target display surface is determined using a suitable calibration technique. A component image for each projector is then estimated using the information from the calibration, and represented in the frequency domain. Each component image is estimated by: Using the projective relationship, determine a set of sub-sampled, regionally shifted images, represented in the frequency domain; each component image is then composed of a respective set of the sub-sampled, regionally shifted images. In an optimization step, the difference between a sum of the component images and a frequency domain representation of a target image is minimized to produce a second, or subsequent, component image for each projector.

14 Claims, 7 Drawing Sheets

OTHER PUBLICATIONS

S. Baker and T. Kanade, "Limits on Super-Resolution and How to Break Them," *Int. Conf. Computer Vision & Pattern Recognition*, vol. 2 (2000) pp. 372-379; {labeled "ATTACHMENT E" of applicants' provisional app. filed in Apr. 2003}.

R. Steele and Christopher Jaynes, "Monitoring and Correction of Geometric Distortion in Projected Displays," *Central European Conference on Computer Graphics and Computer Vision*, (Feb. 4-8, 2002) {labeled "ATTACHMENT G" of applicants' provisional app. filed in Apr. 2003}.

* cited by examiner

SUPER-RESOLUTION OVERLAY IN MULTI-PROJECTOR DISPLAYS

This application claims the benefit of pending U.S. provisional patent application No. 60/464,218 filed 19 Apr. 2003 for the applicants on behalf of the assignee hereof.

The invention disclosed herein was made with United States government support awarded by the following agency: National Science Foundation, under contract number NSF-4-65204. Accordingly, the U.S. Government has certain rights in this invention.

BACKGROUND OF THE INVENTION

Field of the Invention

In general, the present invention relates to light projector systems used for displaying information on a target surface—in the form of a superimposed image of images being projected from multiple projectors—that is under observation of at least one camera. Traditional super-resolution (SR) reconstruction is the process of combining low resolution (LR) images projected from a multiple of front-projection devices in an attempt to recover a higher resolution image. More-particularly, the invention is directed to a technique and system for projecting a superimposed image onto a target display surface under observation of one or more cameras. First, a projective relationship between each projector being used and the target display surface is determined using a suitable calibration technique; aspects of the auto-calibration technique described by one of the applicants hereof in pending U.S. patent application Ser. No. 10/727,953 "Monitoring and Correction of Geometric Distortion in Projected Displays" may be employed. A component image for each projector is then estimated, as represented in the frequency domain $$F_\Delta^p[u, v] = \sum_{r=0}^{N} F_{\Delta r}[u, v].$$

This is accomplished by, using the projective relationship, determining a set of sub-sampled, regionally shifted images represented in the frequency domain, $F_{\Delta r}[u, v]$, for each component image that will be projected from a respective projector, each component image is then composed of a respective set of the sub-sampled, regionally shifted images associated with that projector. Thereafter, the difference between a sum of the component images and a frequency domain representation of a target image, $F_T[u, v]$, is minimized to produce a second, or subsequent, component image for each projector. The later step is a form of 'global optimization', permitting the superimposed image to more-closely approximate the target image. Thus, the target image is decomposed into a set of shifted and sub-sampled image components such that, when these component images are superimposed on the display surface it results in a very close approximation of the high-resolution target image. The decomposed component images are then manipulated so as to minimize the difference between the sum of the components and the target image. A high-resolution image is achieved through the superposition of lower-resolution component images on the display surface. Image compositing takes place on the display surface itself and the technique does not require additional hardware or undue communication between the different projectors in the display.

The instant invention may be utilized in a wide variety of multi-projector display environments, especially those where higher resolution images are desired. By employing two or more projectors of traditional resolution capabilities, according to the invention, without increasing display size, one can achieve high resolution images. Such images are useful in displays used by the news media, for teleconferencing, for entertainment, as medical aides for surgery, for distributed rendering systems and high-resolution defense system displays, and so on. Other areas where decomposition of a higher-resolution image into its subpixel shifted components is useful include image decomposition for layered multichannel transmission and encoding, and visual cryptography. Further applications that benefit from higher resolution images include Infrared Imaging Systems, satellite imagery analysis, video forensics, medical and weather imaging and deep space photography where the increased spatial accuracy provides the ability to resolve small anomalies in the data.

Digital Projection: General Background Information. Digital Projection is Dominated by two technologies: liquid crystal display (LCD) and digital light processors (DLP). LCD projectors, as the name implies, use small transmissive LCD displays to create digital images. Transmittive projectors shine light through the image-forming element (CRT tube, LCD panel). Projectors using LCD typically have a projection lamp that provides a white light source. Light is split into three primary colors (red, green, and blue), and each color is then projected through a LCD display which allows the appropriate portion of light for the desired image to pass through. The 3 filtered colors are then optically recombined and projected for display. This technology appears in many of the portable projectors on the market today. Digital light processors reflect light off the image-forming element. The filtering device is an XY grid of digitally controlled micro-mirrors, constructed with micro-electro mechanical (MEMs) semiconductor technology. Each mirror can be independently tilted under digital control in only 15 millionths of a second. The frequency at which the bitstreamed image code directs each mirror to switch on and off determines the intensity reflected. For a RGB signal, the white light generated by the lamp passes through a color wheel that filters the light into red, green, and blue, from which colors are generated. The on and off states of each micromirror are coordinated with these three basic building blocks of color. Human eyes then blend these rapidly alternating flashes to see the intended hue in a projected image. Today, DLPs are proving highly scalable in resolution, but are limited by being more expensive than polysilicon panels. Since multiple images of different colors are projected in sequence, images can appear to break up into different colors, appearing with a red-green-blue rainbow flash around high-contrast edges.

One of the applicants hereof filed U.S. patent application Ser. No. 10/727,953 entitled Monitoring and Correction of Geometric Distortion in Projected Displays on 3 Dec. 2003; subject matter of application Ser. No. 10/727,953 and that of the instant application, as well as the pending provisional application to which this application claims benefit, was all commonly-owned by the assignee hereof at the time of invention. U.S. patent application Ser. No. 10/727,953 is hereby fully incorporated by reference, and sections are set forth herein, for purposes of supporting one suitable technique of calibrating each projector $p_i$ (or, also written as $P_k$) and camera $c_j$ to recover homographies, $H^c_{pi}$, thus providing a way to calculate an initial set of component image estimates.

The unique calibration technique for an immersive display produced using at least one camera and multiple projectors in application Ser. No. 10/727,953 is used to continuously, automatically monitor and correct disparities in an environment under observation by at least one camera; the technique can detect and correct transient display artifacts and correct for miscalibration due to motion in the underlying devices, i.e., a rectification of arbitrary off-axis distortions that does not require user monitoring/interaction to continuously monitor the state of calibration. The (one or more) camera(s) automatically detects when the projector's orientation has changed. The method runs in concert with interactive display applications and has minimal impact on frame-rate. An initial rectifying transform is recovered automatically by projecting target 'points', or fiducials/targets of a selected intensity/brightness distribution, and observing them within a camera. The display is then warped and passively monitored for calibration error and motion of the projector. A consistency/correlation/similarity score is calculated (and optimized) by, first, generating a predicted view based on the current framebuffer contents and correlating this prediction with the camera's captured, or observed, image. Aspects of that calibration technique, as well as the rigorous mathematical and engineering analyses performed in support thereof, are discussed in Robert M. {Matt} Steele, and Jaynes, Christopher O., "*Monitoring and Correction of Geometric Distortion in Projected Displays*," pgs. 1–8, Central European Conference on Computer Graphics and Computer Vision, 4–8 (Feb. 2002).

Building an immersive tiled display involves selection of a projector style, type of screen and supports, choice of display interface(s) and software, and method of interaction with the display. Importantly, a technique for integrating the image tiles into a seamless whole must be employed. Tile alignment, image overlap blending, intensity falloff correction, and color gamut matching and distortion correction, are a few of the areas of focus in developing tiled displays. Although prior virtual display designs have attempted to overcome super-resolution (SR) issues encountered when employing multiple projector displays in various configurations, the resolution limitation of projectors has hindered the rendering of truly reliable realistic virtual scenes. These prior displays are limited with respect to spatial resolution of the human visual system.

Rather than using partially overlapping projected images to achieve a wide-area display, as is conventionally often done to create tiled displays, projected images may be completely overlapped on top of one other to achieve the addition of light and color in an "optical composition buffer." One hybrid projector-based rendering and display technique, called Computer Graphics Optique, was introduced by A. Majumder and G. Welch, "Computer Graphics Optique: Optical Superposition of Projected Computer Graphics", *Fifth Immersive Projection Technology Workshop, Seventh Eurographics Workshop on Virtual Environments*, Stuttgart, Germany, Springer-Verlag, (May 2001) who used overlapping projectors to replace the analytical computation required for particular computer graphics rendering tasks.

The technique of "stacking", or superimposing, multiple projector images on top of each other creates a region of a display surface illuminated by more than one projector, herein is referred to as "Optical Framebuffer", or "Framebuffer Optique". While a potential for intensity and contrast enhancement, as well as cooperative rendering of linear computer graphics operations of the Framebuffer Optique was noted by Majumder et al. (May 2001), applicants have taken a much different approach. Herein according to the invention, as one will appreciate, the Optical Framebuffer is uniquely utilized to produce high-resolution images from a composite of low-resolution components.

Traditional SR reconstruction addresses the problem of restoring a single SR image from a LR sample given other assumptions and constraints such as noise modeling and error energy. SR images can also be reconstructed from a sequence of LR frames whose relative displacements are known. The given LR input images are assumed to be noisy, down-sampled versions of an unknown SR image that is to be estimated. A common way of inverting the downsampling process is to write down the reconstruction constraints and then solve them, often adding noise prior to regularizing the solution. The first step is to register the images; i.e. compute the motion of pixels from one image to the others. The second step is a 'fusing' of the LR images into a super-resolution image. This fusion process is typically based on the constraints that the super-resolution image, and when appropriately warped and down-sampled to model the image formation process, should yield the low resolution inputs. Much of the narrow focus of traditional SR is toward producing SR still images from a video sequence—several LR frames are combined to produce a single SR frame.

Traditional SR approaches typically have focused on the problem of producing SR still images from a video sequence—wherein several LR frames are combined to produce a single SR frame. One traditional SR reconstruction attempts to compute an HR, noise-free image from a set of lower-resolution, potentially noisy images that are shifted with respect to one another. See, for example, FIG. 1 from M. Elad and A. Feuer, "Restoration of a Single Superresolution Image from Several Blurred, Noisy, and Undersampled Measured Images," IEEE Transactions on Image Processing, Vol. 6, No. 12, (December 1997): which briefly describes certain aspects of four methods for superresolution restoration (pg. 1652) IBP method, a 'frequency domain approach', the POCS approach, and the MAP approach. Although research into multi-projector display systems remains healthy, there has been little work related to exploiting projector overlap. In contrast to earlier efforts by others, applicants utilize advantages of overlapping regions, the Framebuffer Optique, rather than seeking to remove or attenuate their effects—to produce HR image overlay(s).

As mentioned, the inverse super-resolution (ISR) reconstruction technique of the invention uniquely comprises deriving low-resolution (LR) components of a given high-resolution target image, which when superimposed on the display surface (i.e., the LR components make up the Framebuffer Optique), produce an image that quite closely resembles a given target image. The resolution of the target image surpasses that of the component projectors. The multiprojector display is first calibrated and the general projective relationships between the rendering elements are derived and then converted to 2D shift matrices. The target image is then decomposed into appropriate LR components for each projector by downsampling and shifting using the corresponding 2D disparity derived from calibrating the display. Thus, as one will readily appreciate in connection with the instant technical disclosure, there are many fundamental distinguishing features of the instant invention—the decomposition of a HR target image into its LR components—from traditional SR.

SUMMARY OF THE INVENTION

It is a primary object of this invention to provide a technique, and associated system and computer executable program code on a computer readable storage medium, for projecting a superimposed image onto a target display surface that is of higher-resolution than the individual resolution capabilities of the projectors used to project the image. The technique of the invention may be employed in a myriad of front-projected display environments, whether single or multiple projectors and more than one camera is used; associated features of the system and program code will be accordingly adapted to additional projectors and cameras. While discussion herein focuses, by way of example for simplicity, on a two-projector one-camera pairing, more may be employed according to the invention.

As shown and supported, the invention includes a method, associated system and program code, for projecting a superimposed image onto a target display surface under observation of one or more cameras. First, a projective relationship between each projector being used and the target display surface is determined using a suitable calibration technique. A component image for each projector is then estimated using the information from the calibration, as represented in the frequency domain by:

$$F_\Delta^p[u, v] = \sum_{r=0}^{N} F_{\Delta r}[u, v].$$

Each component image is estimated as follows: Using the projective relationship, determine a set of sub-sampled, regionally shifted images, represented in the frequency domain as $F_{\Delta r}[u, v]$; each component image is then composed of a respective set of the sub-sampled, regionally shifted images associated with that projector. Thereafter, in an optimization step, the difference between a sum of the component images and a frequency domain representation of a target image, $F_T[u, v]$, is minimized to produce a second, or subsequent, component image for each projector. During optimization, a second set of frequency domain coefficients for use in producing a frequency domain representation of the second component image for each projector is identified. Taking the inverse Fourier transform of the frequency domain representation of the second component image, converts the information into a spatial signal that is placed into the framebuffer of each component projector and projected therefrom to produce the superimposed image.

There are numerous further patentably distinguishing features of the technique, system and program code of the invention. The step of determining a projective relationship can include: (a) observing the target display surface with camera, c; (b) recovering a homography between each projector, pi, and the camera, $H_{pi}^c$, and (c) using this homography, $H_{pi}^c$, determine the projective relationship, $H_{pi}^b$, wherein b represents a reference frame for the target display surface. The step to determine the sub-sampled, regionally shifted images, can further include: (a) decomposing each projective relationship, $H_{pi}^b$, into a linear shift matrix representing offsets between a respective of the projectors pi, and reference frame b; wherein (b) this linear shift matrix is used to determine the set of sub-sampled, regionally shifted images associated with a respective projector, pi. The step to minimize the difference between the sum of estimated components and the frequency domain representation of a target image, $F_T[u, v]$, can be performed by:

(a) minimizing the expression:

$$\left\| F_T[u, v] - \left( \sum_{i=0}^{k} F_\Delta^i[u, v] \right) \right\|^2$$

wherein k represents the total number of projectors employed to project component images—making up the superimposed image—and the component image for each projector is represented by $$F_\Delta^p[u, v] = \sum_{r=0}^{N} F_{\Delta r}[u, v],$$

and the sub-sampled, regionally shifted images represented in the frequency domain are represented by $F_{\Delta r}[u, v]$, to identify a second set of frequency domain coefficients for use in producing a frequency domain representation of the second component image for a respective one of the projectors; and (b) taking the inverse Fourier transform of this frequency domain representation of the second component image, thus converting to spatial signal which can be fed into the projector for display.

As can be appreciated, certain of the many unique features, as well as the further-unique combinations thereof, supported and contemplated hereby within the spirit and scope of this disclosure, may provide a variety of advantages. The advantages of these new features and combinations, as disclosed, will be better appreciated by perusing the instant technical discussion, including drawings, claims, and abstract, in light of drawbacks to traditional techniques identified throughout, or as may be uncovered. The unique technique and associated system and program code, provides design options and versatility to accommodate a wide variety of applications. Thus, it is noted that:

(a) Ease of operability—An ability to utilize familiar, off-the-shelf multi-projector camera equipment for producing front-projected superimposed displays of sufficient resolution to carry out aspects of the invention, is provided.

(b) Flexibility of design and use—The technique of the invention can be tailored for use with a wide variety of front-projected display equipment to display a myriad of different still-, motional-, video-, and so on, target images/image functions.

(c) Manufacturability—The unique technique and system of the invention can be tailored to current, as well as those under development or yet-to-be-developed, single and multi-projector-camera projection systems, providing a cost-effective means by which systems can be upgraded, or sold initially as a complete package.

BRIEF DESCRIPTION OF THE DRAWINGS

For purposes of illustrating the innovative nature plus the flexibility of design and versatility of the preferred system and technique disclosed hereby, the invention will be better appreciated by reviewing the accompanying drawings (in which like numerals, if included, designate like parts). One can appreciate the many features that distinguish the instant invention from known, attempted SR projection techniques. The drawings have been included to communicate the features of the innovative platform structure and associated technique of the invention by way of example, only, and are in no way intended to unduly limit the disclosure hereof.

DETAILED DESCRIPTION OF EMBODIMENTS DEPICTED IN DRAWINGS

Figure 6:
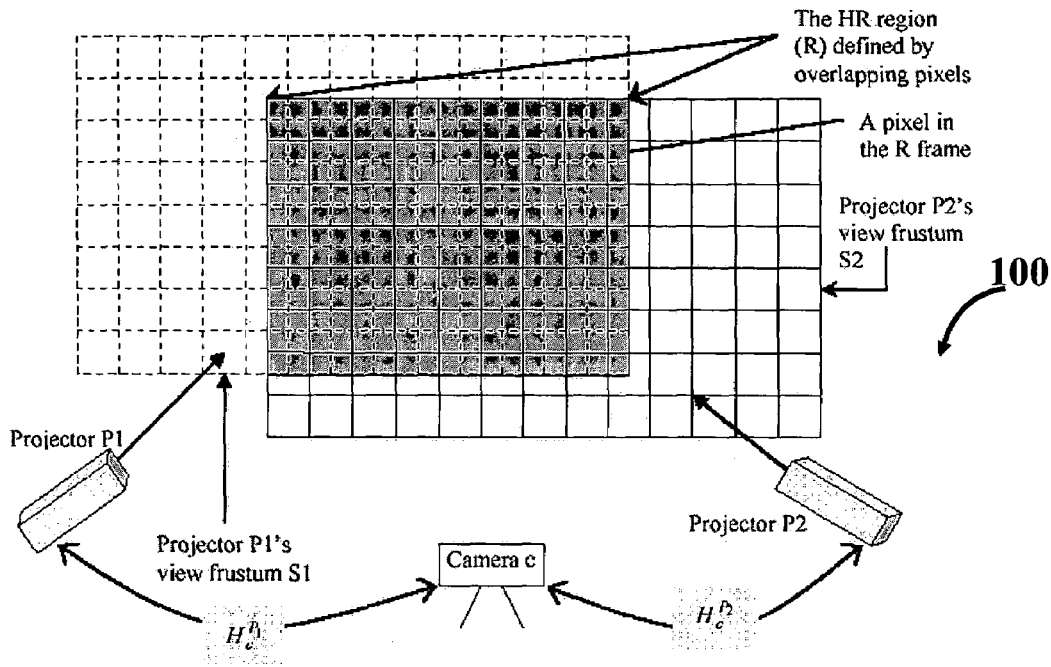

In connection with discussing the features in FIGS. 1-2, occasional reference will be made back-and-forth to other of the figures, all of which collectively detail core, as well as further unique and distinguishing features of technique of the invention at 10 and 50—and further providing a pictorial demonstration of the flexibility of design of this invention. As one can appreciate, the configuration of the simplified projector-camera pair system 100 in FIG. 6 is suitable for a wide variety of display shapes and environments.

Figure 1:
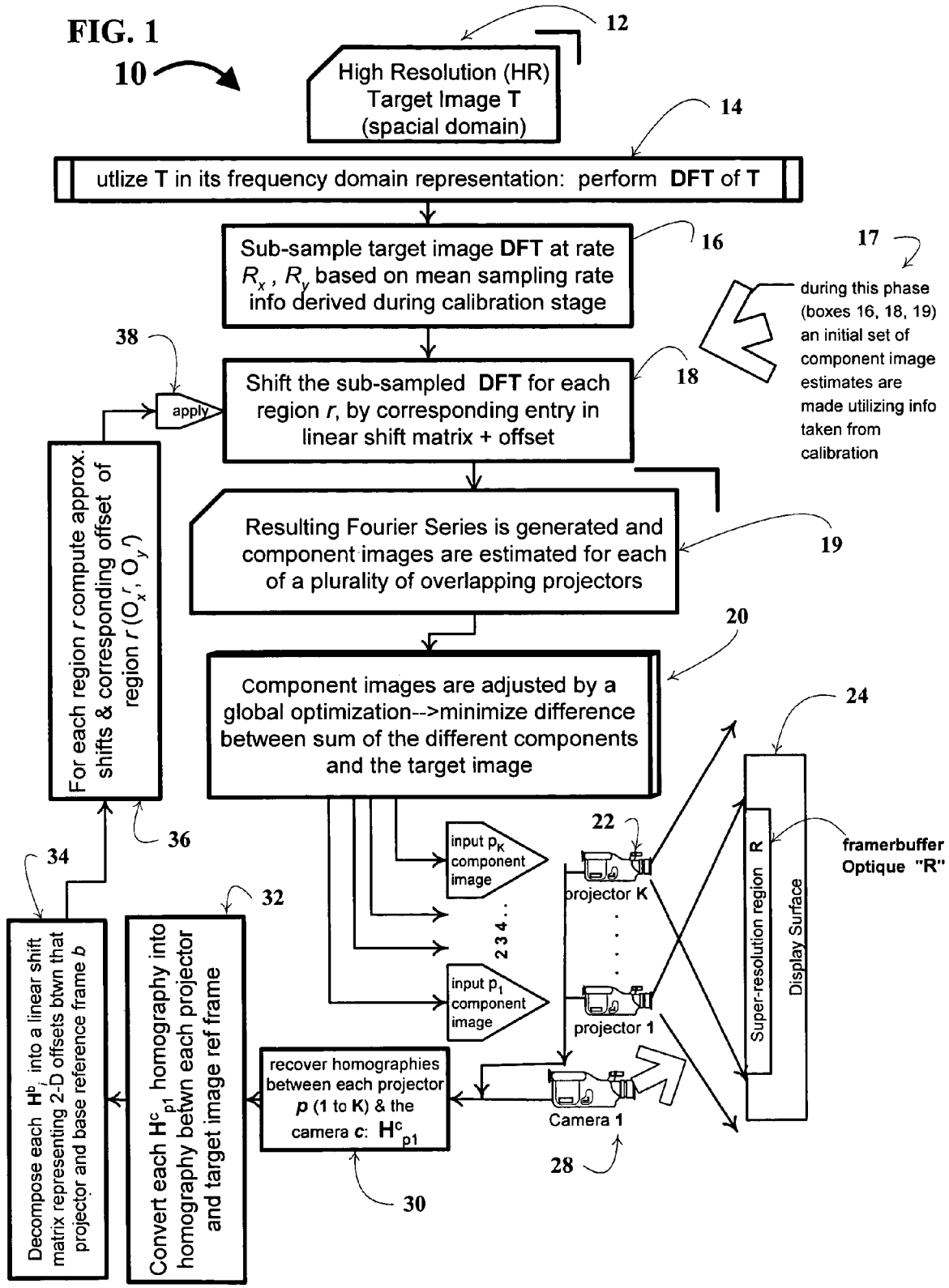
FIG. 1 depicts a multi-projector-camera system 10 in a flow-schematic fashion outlining core and additional features of the invention, having up-to k number of component projectors, each employed to display a component image that contributes to the superimposed image—identified as Framebuffer Optique, R—onto a display surface 24.

FIG. 1 depicts a multi-projector-camera system 10 in a flow-schematic fashion outlining core and additional features of the invention, having up-to k number of component projectors (22), each employed to display a component image that contributes to the superimposed image—identified as Framebuffer Optique, R—onto a display surface 24. Framebuffer Optique, R is under observation by camera 28. FIG. 2 is a flow diagram depicting details of a method, or technique, 50 for projecting a superimposed image onto a target display surface (24, FIG. 1) under observation of one or more cameras—illustrated are core, as well as further distinguishing, features of the invention for producing images using features such as those represented/illustrated by FIGS. 1 and 6–8.

The technique requires at least two overlapping projectors $P_1$ and $P_2$ whose view frustums illuminate a display surface-as shown in FIGS. 4, 5a–5b, 6 by way of example, the display surface may be planar. During an initial calibration phase, a camera is used to recover a homography between each projector and a base projector frame (boxes 16, 30, 34, of FIG. 1 and box 64, 66 of FIG. 2). A base projector frame is aligned with the high-resolution space and only differs in its resolution. Sub-pixel overlap defines pixels in the high-resolution target frame—for reference, see FIGS. 4, 5a–5b, 6. Because each projector is related to the target frame via a general homography, the relative 2-D shift and sampling rate will change across the display. The component homographies are approximated by a set of 2-D sub-pixel shifts (referred to herein as a linear shift matrix) that represents the sub-pixel disparity of one projector with respect to the target image reference frame, for a given image sub-region (boxes 34, 36, FIG. 1 and box 66, FIG. 2). Although sampling rates change across the display, one may presume they are fixed as the mean pixel-sampling rate from each projector to the target frame. In practice, sampling rates change slowly for most configurations (i.e. projector optic axis somewhat orthogonal to the display), and do not govern the appearance of a component image. Component images are estimated in the frequency domain where the target image is sub-sampled and phase shifted according to the sampling rate and shift matrix for each component (at 38, 18, 19 of FIG. 1 and boxes 67, 56, 58, FIG. 2. The resulting amplitudes and phase values are then optimized according to a cost function that measures the difference between the target image and the image that results from adding the multiple sub-sampled, shifted components together (box 20, FIG. 1 and box 60, FIG. 2). Component images are projected onto the display surface, resulting in a super-resolution image that more closely approximates the target than is possible with a single lower-resolution projector (box 20, FIG. 1 and box 62, FIG. 2).

Calibration. In order to compute the sub-pixel disparity between projectors and a target frame, pixel correspondences between any two projectors must be known to sub-pixel accuracy (for general reference, see FIGS. 4, 5a–5b, 6). The epipolar relationship between pairs of projectors and a known surface model is sufficient to compute pixel correspondences for every pixel in the Framebuffer. By way of example here, the display surface is constrained to be planar, so that the full projective relationship between any two devices, i and j can be modeled as a 3×3 homography matrix that maps pixels in projector j directly to pixels in projector i, through the display plane. The homography can be automatically computed given a sufficient set of matchpoints between the two projectors in question. Matchpoints are first computed between a camera that observes the display surface, and each projector in the display. For each projector, a set of Gaussian target fiducials centered at randomly selected framebuffer pixels are iteratively displayed. The target is captured in the camera and a matchpoint pair is stored. The subpixel location of the target in the camera is computed through an optimization routine that estimates the parameters of homography, taking into account surface warp and the known Gaussian shape. See also, FIG. 3 and associated discussion, below.

Figure 2:
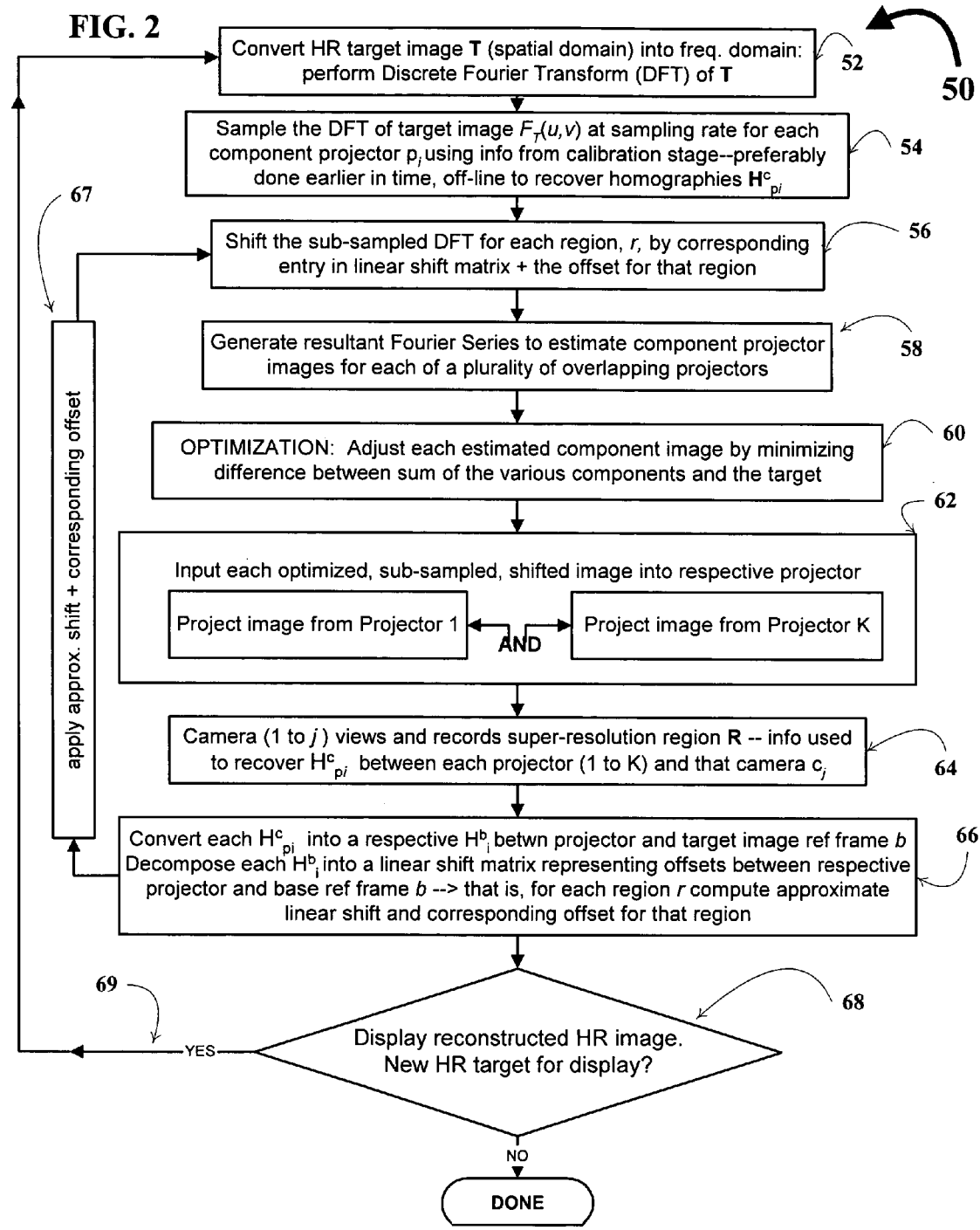
FIG. 2 is a flow diagram depicting details of a method, or technique, 50 for projecting a superimposed image onto a target display surface (24, FIG. 1) under observation of one or more cameras—illustrated are core, as well as further distinguishing, features of the invention for producing images using features such as those represented/illustrated by FIGS. 1 and 6–8.
Figure 4:
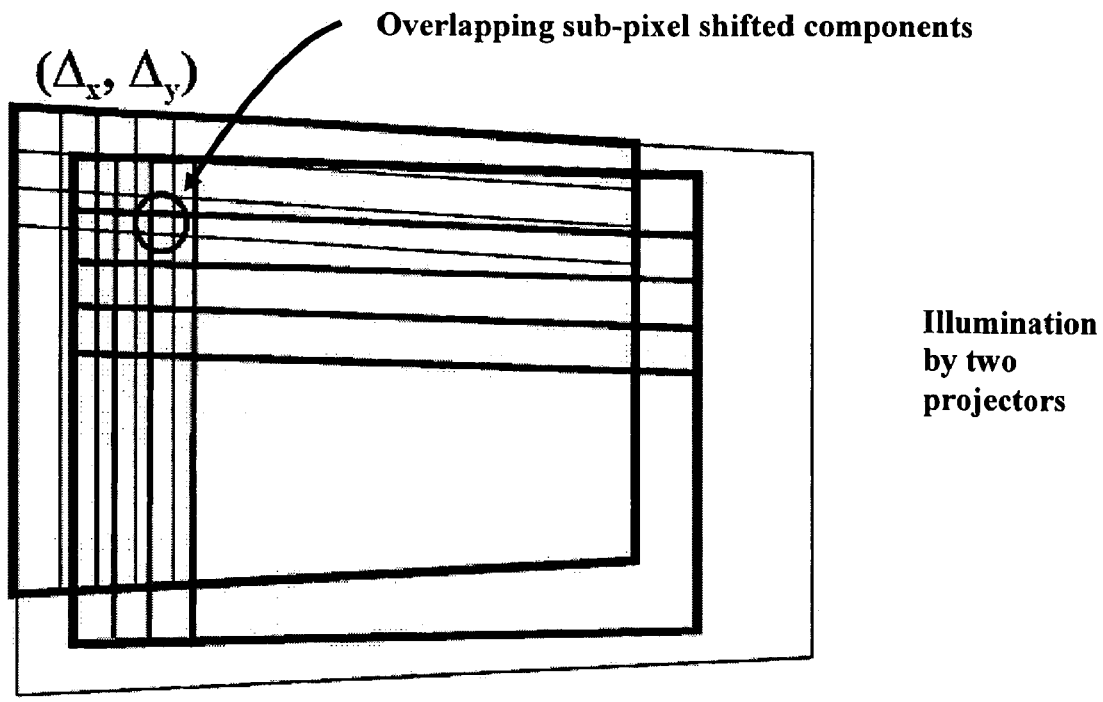
FIGS. 4, 5a–5b, and 6 diagrammatically represent (on a pixel/sub-pixel scale to show overlap) the images projected from component projectors, identified as $P_1$ and $P_2$, for purposes of reference in support of the theoretical foundation discussion offered herein.
Figure 5A:
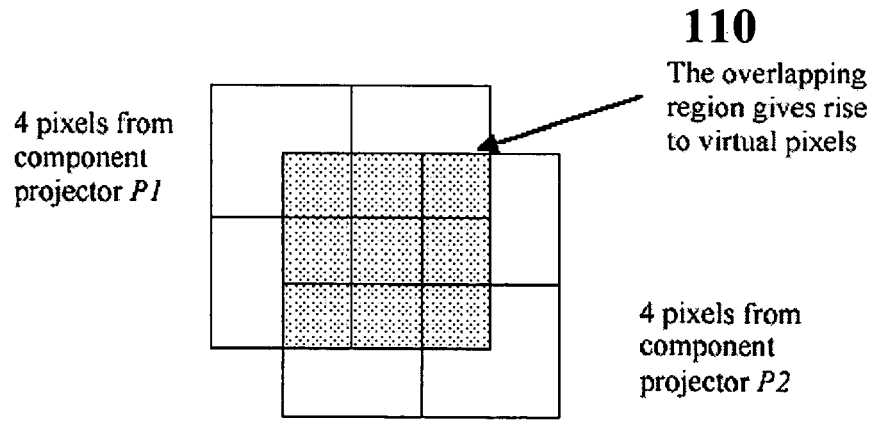
Figure 5B:
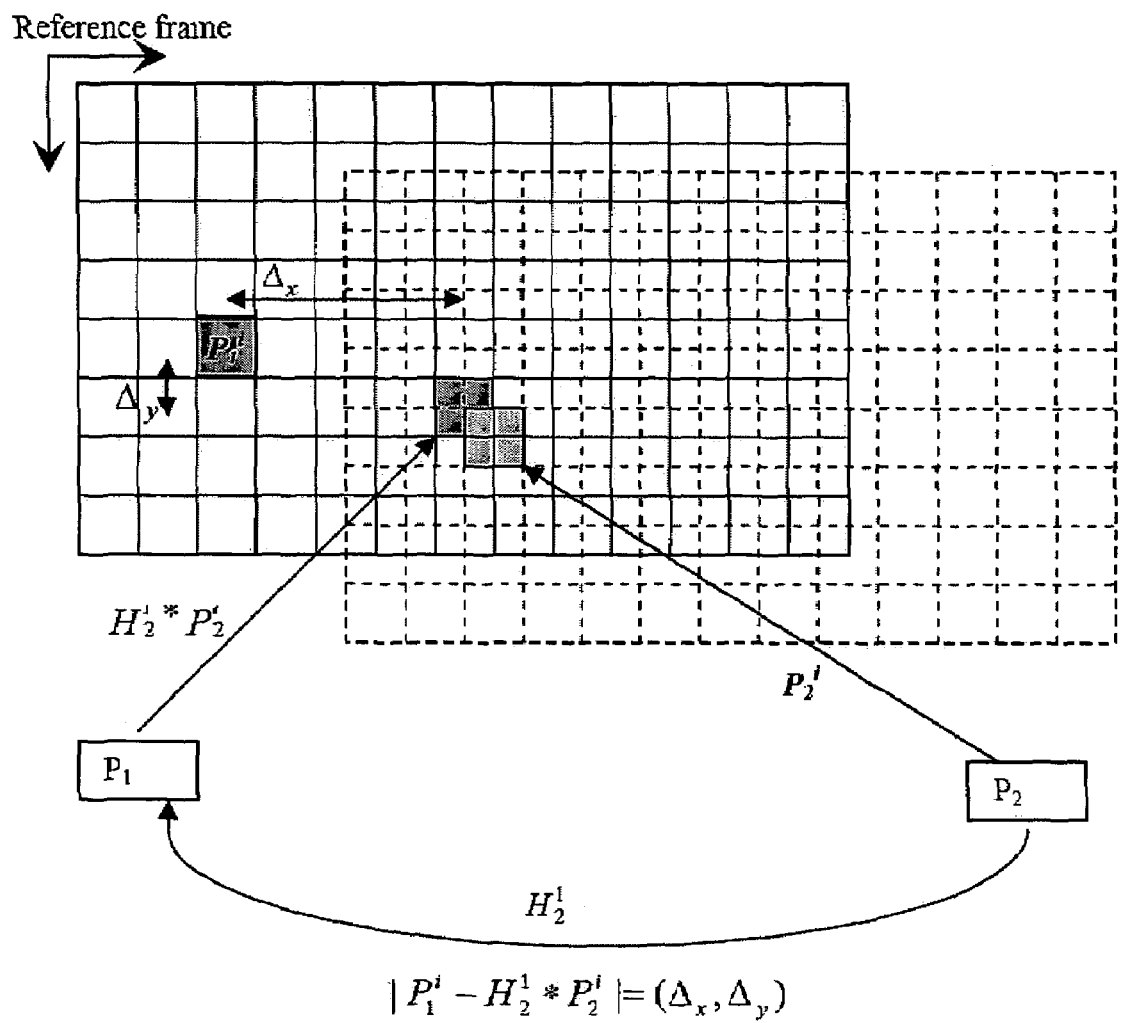

Given a sufficient number of correspondences (25, for example), a homography between each projector pi and the camera c, $H_{pi}^{c}$, is then computed using linear least squares estimation (refer to FIGS. 4, 5b, 6; boxes 16, 30 of FIG. 1; and boxes 54, 64, 66 of FIG. 2). These projector-to-camera matrices are then converted into a homography between each projector and the target image reference frame. An arbitrary projector framebuffer is selected as the base projector reference frame. Although the target frame and base projector framebuffer are of different resolutions (the target is presumed significantly higher), this projector defines the target space up to an unknown scale by assuming that the base framebuffer is axis-aligned with, and shares the origin of the target image space. Therefore, the relationship between any projector (i) and this target image frame (b) can be written as a composite homography, or $H_i^b$, from the projector (i) to the camera (c), and then to the base projector frame (b)—see the FIG. 5b and FIG. 4 schematic representations, boxes 32, 34 of FIG. 1, and box 66, FIG. 2:

$$H_i^b = (H_b^c)^{-1} H_{p_i}^c$$

Multiple projectors overlap on the display surface and are each shifted with respect to the base frame. Shifted overlapping pixels give rise to the higher resolution space where sub-pixel shifts define integer pixels in the high-resolution target frame. By way of example only, in connection with any results shown here, it was assumed the sub-pixel calibration accuracy up to ⅕th of a pixel resulting in resolutions in the target frame that are 5-times those of component projectors.

For purposes of explanation, the low-resolution component images are modeled as sub-sampled versions of the image target with a uniform 2-D shift and sampling rate with respect to the target frame of reference. Since each projector is related to the target frame via a general homography, the relative 2-D shift and sampling rate will change across the display. The component homographies are approximated by a set of 2-D sub-pixel shifts (referred to as the linear shift matrix) that represents the sub-pixel disparity of one projector with respect to the target image reference frame, for a given image sub-region.

A projective warp between two projectors describes a more general displacement than uniform shift. To derive an appropriate component image, without the undue computation associated with a per-pixel solution, the homography is approximated by a set of 2-D shift vectors between a projector and the target display reference frame. Therefore, the homography between projector i and the base frame is decomposed into a linear shift matrix that represents 2-D offsets between the projector and the base reference frame. Each entry in the shift matrix corresponds to a region in the target reference frame for which the 2-D offset is assumed to be constant. Once computed, the shift matrix replaces the more general homography and regions in the component frame are related to the target frame through a constant, 2-D offset. Refer generally, to boxes 36, 38, 18 of FIG. 1 and boxes 66, 67, and 56 of FIG. 2.

The 2-D disparity, Δ, between a component projector reference frame pi and target frame b is written as the difference between the locations of a pixel in frame pi the same pixel in frame b (given by the known homography):

$$\Delta = P - H_{p_i}^b p$$

The disparity in x and y directions ($\Delta_x$, $\Delta_y$) is independently given by:

$$\Delta_x = p_x - \frac{H_1 p_x}{H_3 p_x}$$

$$\Delta_y = p_y - \frac{H_2 p_y}{H_3 p_y}$$

where $H_k$ is the vector formed by the $k^{th}$ row of the matrix $H_{p_i}^b$. If $\Delta_x$ and $\Delta_y$ are independent, the disparity value is a linear function of the pixel position in the component frame.

Figure 8:
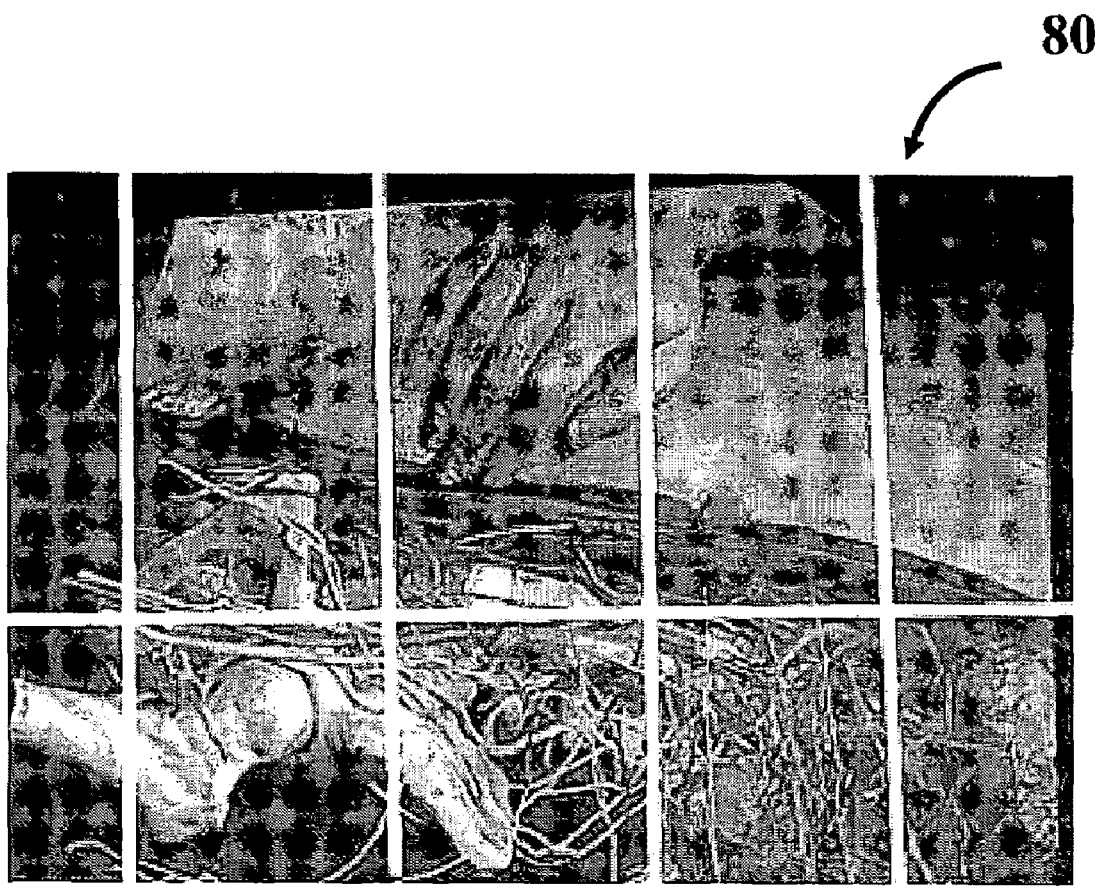
FIG. 8 is an image projected from a component projector depicting regional sub-components (here there are 10) of uniform 2-D disparity, white lines denote boundaries of uniform 2-D displacement. Each component from a projector is composed of a set of the sub-components, having been derived utilizing a 2-D linear shift matrix.

As x ranges from zero in the component projector to $x_{max}$, the resolution of projector in the x direction, the disparity values will vary in accordance with the line equation given above. This line is divided into k equal regions such that the disparity values in the region are all within $\epsilon_x$ of one another. Conceptually, these k regions are columns in the component image that will use the same approximate x-shift values, $\sim\Delta_x$, for the purposes of deriving the component image corresponding to pixels contained in that column. Given the line equation for independent disparities in the y direction (above), a similar process divides the component frame into rows of uniform y-disparity with error tolerance $\epsilon_y$. These regions are combined to produce regions in the component image containing approximate values for 2-D shifts that are within $\epsilon \leq \sqrt{\epsilon_x^2 + \epsilon_y^2}$ of the values represented in the actual homography. Therefore, for a given error tolerance E (by way of example, one may select as 0.2 pixels), the homography can be decomposed into areas of uniform disparity. These region-based 2-D approximate shifts, ($\sim\Delta_x$, $\sim\Delta_y$), and the corresponding offset of the region itself, ($O_x$, $O_y$), are used to derive the component image for a respective projector. FIG. 8 depicts ten regions 80 corresponding to a 5×2 shift matrix, computed from the homography between a respective projector to the base frame for a two-projector setup. Given a fixed error tolerance, for example, the number of regions computed by this process is related to the amount of projective (off-axis) distortion induced by the viewing geometry.

Component Image Estimation. Component image estimation is performed in the frequency domain where initial images are first estimated (box 19, FIG. 1 and box 58, FIG. 2) and then optimized (box 20, FIG. 1 and box 60, FIG. 2). Component images are not constructed in the spatial domain because overlapping pixel intensities and the constraints they represent are difficult to characterize. Rather, a given target image is first converted to the resolution of the Framebuffer Optique, defined by the sub-pixel shift pattern recovered in the calibration phase. This target image I(x,y) is converted to a corresponding discrete Fourier transform (DFT) $F_T(u, v)$—box 14, FIG. 1 and box 52, FIG. 2.

Figure 7:
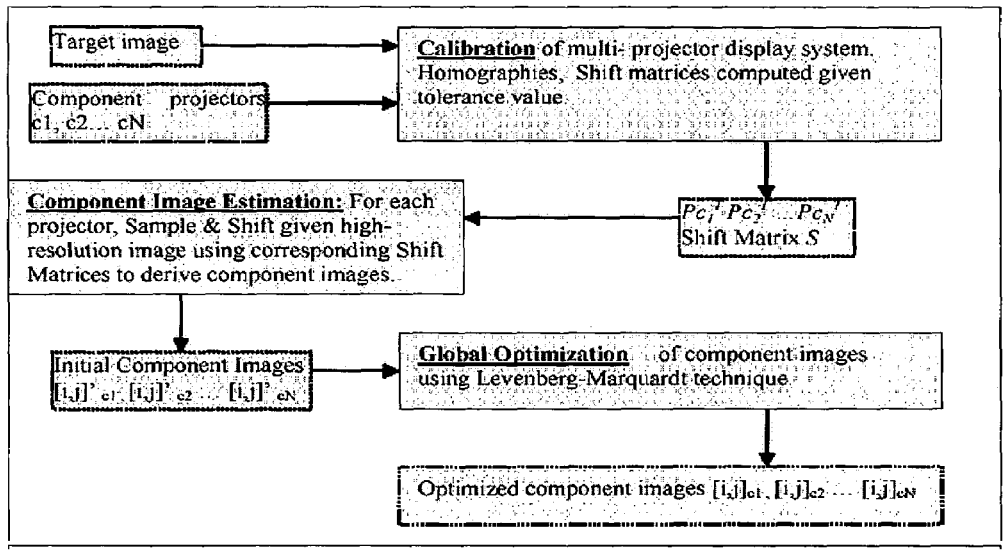
FIG. 7 is a high-level depiction in flow-diagram format, of a technique 70 of the invention.

Referencing also the high-level flow diagram in FIG. 7, at 70, a component image for a particular projector is estimated in two phases. First, sub-components for the n regions of uniform disparity are derived (see also, FIG. 8). Following that, sub-components are combined to form a single component image for the projector. The target image DFT is sub-sampled at a rate of $R_x$ and $R_y$ based on mean sampling-rate derived from the calibration phase for a particular component projector with respect to the target frame. The DFT of the target image $F_T(u, v)$, and the sampled component image, $F_s(u, v)$, are related via aliasing:

$$F_S[u, v] = \alpha \sum_{p=0}^{N-1} \sum_{q=0}^{M-1} F_T\left(\frac{k}{MR_x} + p f_{sx}, \frac{l}{NR_y} + q f_{sy}\right)$$

where $f_{sx} = 1/R_x$ and $f_{sy} = 1/R_y$ are the 2-D sampling rates in x and y directions. Again, non-uniform sampling rates can be supported by this framework and can be estimated on a per-region basis in a manner similar to that used to estimate two-dimensional disparity. The sub-sampled DFT signal is shifted, for each region r, by the corresponding entry in the Linear Shift Matrix, $(\sim\Delta_x^r, \sim\Delta_y^r)$ plus the offset $(O_x^r, O_y^r)$ for that region. The shifting property of the Fourier transform relates spatial domain translations $(\sim\Delta_x^r+O_x^r, \sim\Delta_y^r+O_y^r)$ to a phase shift in the frequency domain as:

$$F_{\Delta r}[u,v] = e^{j2\pi((-\Delta_x^r+O_x^r)u+(-\Delta_y^r+O_y^r)v)} F_s(u,v)$$

The equation immediately above holds for a stationary signal and shifting the signal for a finite region of the target image may result in flawed frequency coefficients due to boundary problems. In practice, a region of size w×h is extended by the magnitude of the phase shift to include neighboring pixels. For regions on the image edge, the edge values of the image are copied into a border whose size is defined by the magnitude of the phase shift. The Fourier series $F_{\Delta r}$ [u, v] is the frequency space representation of the sub-sampled, shifted image for a specific region in the component image. Each of the n regions is then composed into a single Fourier series using the distributive property of the Fourier transform over addition. This results in a single Fourier series for a component projector, p, as written:

$$F_\Delta^p[u, v] = \sum_{r=0}^{N} F_{\Delta r}[u, v]$$

Optimization. Component images, computed for each overlapping projector, are derived independently. These initial components do not take the additive nature of the superposition process into account and are, thus, adjusted in an optimization phase. Each derived component image for each of the k projectors, $F_{66}^p$, is treated as the initial estimate for an optimization phase that seeks to minimize the difference between the sum of the different components and the image target. The superposition process is modeled on the display surface as additive, and the following expression is minimized:

$$\left\| F_T[u, v] - \left( \sum_{i=0}^{k} F_\Delta^i[u, v] \right) \right\|^2$$

This error metric, with the constraint that the solution lies within radius r of the initial estimate, is used to estimate the k*N*M parameters of the system, where N and M are the x and y resolution of the component images. The immediately above equation is minimized using the Levenberg-Marquardt technique and converges quickly in practice, but can be a costly process for certain configurations and target images. Please reference FIGS. 1 and 2 at 20 and 60, and FIG. 7, generally.

Optimization is key to producing super-positioned images that more closely resemble the target image function. A more accurate initial estimate of the component projector images prior to optimization, to more-efficiently utilize computing resources. The optimization step yields a new set of component DFT coefficients for each projector. The frequency domain representation is then converted to a spatial signal via the inverse Fourier transform that can then be placed directly into the Framebuffer of each component projector for display on surface 24. Please refer to FIGS. 1 and 2 at 20, 22 and 62 and 68.

The inverse of the sub-sampled and shifted Fourier series yields the image $H_p(x,y)$ to be rendered by the component projector p.

$$H_p(x,y) = FFT^{-1}(F_\Delta^p)$$

The inverse DFT of an image signal (IDFT) is defined by:

$$H_p(x, y) = \frac{1}{M*N}\left(\sum_{u=0}^{M-1}\sum_{v=0}^{N-1} F_\Delta^p(u, v)e^{j2\Pi\left(\frac{ux}{M}+\frac{vy}{N}\right)}\right),$$

$$x = 0, 1, 2, \ldots, M-1, y = 0, 1, 2, \ldots N-1$$

By way of example only, the component image thus projected by each projector may be subdivided into sixteen regions of uniform shifts, using a Linear Shift Matrix such as:

$$\Delta_x = \begin{bmatrix} 99.6 & 99.24 & 98.7 & 98 \\ 99.8 & 98.84 & 98.3 & 97.5 \\ 100.28 & 99 & 98.24 & 97 \\ 100.54 & 99.78 & 99 & 96.4 \end{bmatrix}$$

$$\Delta_y = \begin{bmatrix} 39.4 & 39.24 & 38.7 & 38 \\ 39.6 & 38.84 & 38.3 & 37.2 \\ 40.26 & 40.42 & 39.2 & 37.7 \\ 40.5 & 39.78 & 39 & 35.9 \end{bmatrix}$$

TABLE 1, below, lists different types of high-resolution satellite imagery and the number of 1024×768 projectors at about 15 feet from the display wall employed to render these images effectively at original resolution, by way of example only.

| Satellite Information | High-Resolution Satellite Images | No. of Projectors required | | Display Surface area in ft. | |
|---|---|---|---|---|---|
| | | ISR approach | Traditional tiled display | ISR approach | Traditional tiled display |
| Geostationary Meteorological Satellite | 2291 × 2500 | 4 | 12 | 8 × 6 | 18 × 20 |
| Galilean Satellites | 5748 × 2874 | 6 | 24 | 8 × 6 | 36 × 20 |
| Voyager | 5760 × 2880 | 6 | 18 | 8 × 6 | 36 × 20 |
| Galileo-Voyager | 4137 × 2069 | 5 | 15 | 8 × 6 | 30 × 15 |

Notice, here, that the number of projectors required in typical tiled rendering approaches is a multiple of that needed using the ISR technique according to the invention. The display surface area is measured in a front-projector display setup with projectors about 15 feet away from the wall and almost orthogonal to it. A single projector 15 feet away from the display surface typically covers about 6×5 ft. Hence a constant display area, determined by the display setup, is specified. By way of further example, only: High-resolution image files of digital library collections such as the "Electronic Beowulf" are 2320 by 3072 pixels in size, occupying 20–25 MB of memory. Employing the ISR technique of the invention can reproduce an approximation of high resolution images using four projectors of resolution 1024×768 by dividing the high resolution imagery amongst them. Traditional tiled display wall applications would require twelve 1024×768 projectors to render the same.

Figure 3:
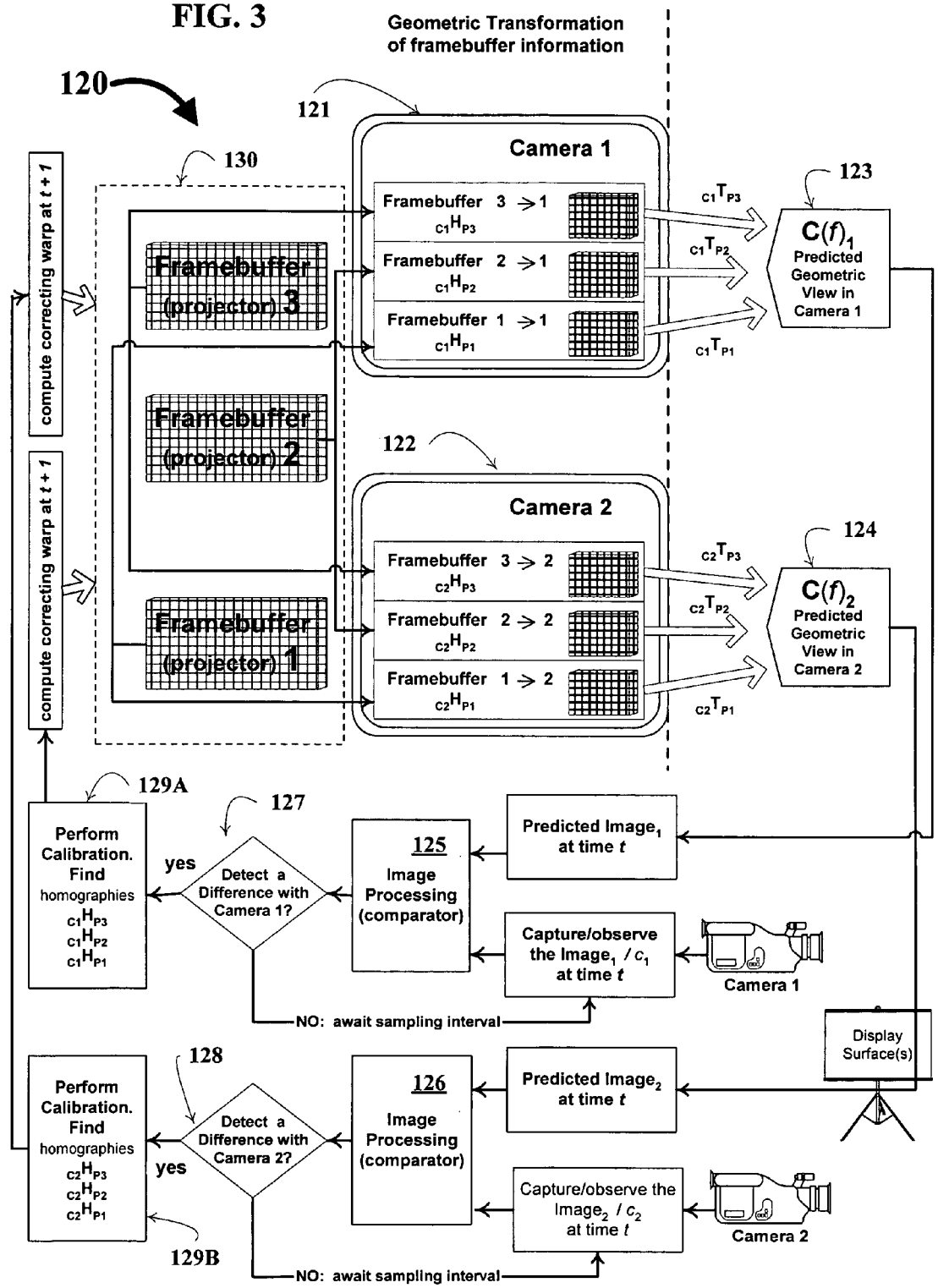
FIG. 3 is a system schematic, similar to that labeled FIG. 2 in calibration technique patent application Ser. No. 10/727,953, depicting data/information flow in connection with a multi-projector system 120 that may be employed to project a superimposed image according to the invention (framebuffers are identified 1, 2, and 3 and associated with a respective projector, plus two cameras are included and labeled 1 and 2, by way of example).

Now turning specifically to FIG. 3: It is a system schematic similar to that labeled as FIG. 2 in calibration technique patent application Ser. No. 10/727,953 (having a common applicant hereto). Schematically depicted at 120, data/information flow in connection with a multi-projector system (framebuffers are identified 1, 2, and 3 and associated with a respective projector and each camera 1 and 2). Preferably, at least one camera is able to observe the screen surface at all times for which the process of detecting is engaged. For example, the placement of the cameras in the display environment might be: mounting overhead to minimize the chance of occlusion by the user.

Calibration of each device within the system engaged in producing the display is critical to detection and a resulting corrective adjustment. Initially, changes due to unexpected radiometric artifacts on the display surface are detected. Predicted imagery is constructed for a specific camera position and color transfer function and compared to captured images. Predicted images 123, 124 are constructed using the identified position of the camera with respect to each projector as well as a unique color (transfer function) calibration phase applied in a straightforward manner. Given a camera-projector pair, geometric calibration comprises the transformation from pixels in the camera plane (shown within box defined at 121 and box defined at 122) to their corresponding positions in the projectors' frame buffers (depicted within dashed box 130 are three framebuffers identified as 1–3). Given this transform, regions in shadow, observed in a camera, can then be correctly adjusted in the projected imagery. Once the homography between each projector and the camera has been recovered (boxes 125, 127, 129A and boxes 126, 128, 129B), a composition homography can be constructed to relate projector pixels to one another. Each projector projects a grid pattern that is parallel the axes of its own framebuffer. Given the known calibration, a coherent grid can be drawn by all projectors in the respective reference frame of a single projector.

Provided, next, for reference only in connection with calibration (FIG. 3) to identify homographies between the camera and each projector, the auto-calibration technique in U.S. patent application Ser. No. 10/727,953 entitled Monitoring and Correction of Geometric Distortion in Projected Displays, describes the operation of that technique, as follows:

Precomputation/measurement (a pre-calibration that preferably takes place once a camera is fixed in relation to the projector by suitable means, at 'the factory');

Calibration performed with the camera-projector apparatus on-site, turned on and ready for operation in connection with a static and/or video/motion display presentation (and in the case of an on-going presentation—a "re-calibration" would be performed to correct display that has been perturbed, including lighting changes, shift in projector position, perhaps occlusions in front of the display, and so on); and Verify Calibration where a preferably random sample of the framebuffer is taken to continuously monitor display for a perturbation requiring a re-calibration. Further, the basic technique for computing matchpoints identified therein, follows:

1. Project nothing (i.e. just project a black image).
2. Observe this image with the camera, and call it the background image B.
3. Project a point at some location $(p_x, p_y)$ in the projector's image coordinates (also called framebuffer).
4. Observe this image with the camera, and call it the foreground image F.
5. Compute a difference image, D=F−B.
6. Inspect each pixel of the difference image, D: If the pixel under consideration is brighter than a threshold pixel intensity, t, set the pixel to white. Otherwise, set it black. Resulting image is considered a binary image, because there are only two colors of pixels in it, white and black.
7. To find the biggest conglomeration (blob) of white pixels in this image, use a known technique called connected component analysis.
8. Draw/compute a rectangle (or "bounding box") around the biggest identified conglomeration (blob) of white pixels (step 7) such that, the sides of the box are parallel with the sides of the image. The center of this rectangle, $(c_x, c_y)$ is used as an estimate of where the camera saw the "point" projected during step 3.
9. Output [ $(p_x, p_y), (c_x, c_y)$ ]. This is the correspondence, or "matchpoint". [Preferably, must perform this routine at least four times to estimate the homography, i.e., the projector to camera transform.]

In connection with step 3. outlined above, note that a "point" target is projected at some preselected location of the projector's framebuffer. Preferably according to the invention, the target/fiducial takes the form of a projected white, filled-in circle, or Guassian distribution of light intensities, comprising a white center that fades into darker shades of gray the further one moves from the white center, until the surrounding region is solid black (resulting in a blurred, filled-in circle)—the intensity (brightness, or whiteness) of this fiducial being governed by the following expression:

$$I(x, y) = e^{-((x-p_x)^2 + (y-p_y)^2)/sigma}$$

This expression defines circularly symmetric two-dimensional Gaussians—or, blurred circles—of a preselected size, where "sigma", the variance, is a value set such that the blurred circular targets are of the selected size (by way of example only, sigma can be set between ~5 and 15 pixels).

Referring to step 8., an alternative to that outlined above, includes the following: While a rectangle (bounding box) can be computed around the identified conglomeration (blob) of white pixels, the center of which, $(c_x, c_y)$ is used as an estimate of where the camera saw the "point" projected, such a bounding box can also be constructed for the largest conglomeration (blob) of white pixels in the projector framebuffer. For this bounding box, let's say that its top is at $p_y$+sigma, it's bottom is at $p_y$−sigma, its left edge is at $p_x$−sigma, and it's right edge is at $p_x$+sigma. Note that the projector bounding box has four corners, as does the bounding box drawn/calculated for the blob in the camera. One can then list four correspondences, consisting of: [(upper-left corner of projector's bounding box), (upper-left corner of camera's bounding box)]; [(upper-right corner of projector's bounding box), (upper-right corner of camera's bounding box)]; and so on. These four correspondences can be used to compute a homography matrix, call it $H_{temp}$. Next, for example, one can evaluate a normalized cross correlation— an image "similarity/correlation score" that is well-known in image processing and computer vision—on those pixels that fall inside the bounding box computed for the camera. This similarity score, as a function of $H_{temp}$, is maximized: $H_{temp}$ has 8 parameters (here, one can take advantage of the radial symmetry of the Gaussian pattern selected to reduce $H_{temp}$ to 7 parameters, to speed up computation); using an iterative multidimensional optimization technique such as MIN-PACK's lmdif( ) searcher or Numerical Recipes in C API ("application programming interface")—both of which are currently distributed, find the $H_{temp}$ that maximizes the similgarity score. From this $H_{temp}$ (using the H output by the search technique), take $(c_x, c_y) = H_{temp}(p_x, p_y)$. One can then output the $[(P_x, p_y), (c_x, c_y)]$, which is the correspondence sought (step 9 above).

FIGS. 4, 5a–5b, and 6 diagrammatically represent (on a pixel/sub-pixel scale to show overlap) the images projected from component projectors, identified as $P_1$ and $P_2$, for purposes of reference in support of the theoretical foundation discussion offered herein. Turning first to FIG. 5a, as mentioned to achieve super-resolution, the component LR images are constructed in the frequency domain rather than the spatial domain because it less difficult to characterize overlapping pixel intensities and the constraints they represent. For example, to address the virtual pixels (shaded in gray at 110 in the FIG. 5a) in the spatial domain that are formed as a result of overlap of the pixels in the LR frames P1 and P2, the component pixels from the projectors are assigned intensity values that would sum up to the desired value at the overlap region. Although this would succeed in filling the virtual pixels with desired intensity, the remaining LR pixel area might pose other constraints. Soon, these constraints grow extending up to the boundary of the image itself. These constraints are complex and time consuming to solve. On the other hand, in the frequency domain formulation, these constraints are applied in the optimization phase.

Theoretically, the optimization technique can be broken down another way as follows:
Given
a target image T whose resolution is given by $(X, Y)_T$,
a set of N overlapping projected images c=1 . . . N with resolutions of $(x, y)_c$, and
the known projective relation P between any image c and T, such that pixels in c and T can be related as $(\tilde{i}, \tilde{j})_T = P_c^T * (i,j)_c$,
Derive the contents of all c such that the difference between the composition of c and T is minimized. That is, $$\left\| \sum_{c=1}^{N} P_c^T(i, j)_c - (i, j)_T \right\|^2$$

is minimized.

Thus, given multiple projectors oriented in a manner that each is capable of projecting a respective overlapping component image, a superimposed image may be achieved by computing an appropriate set of component images and co-operatively projecting from the projectors, onto a suitable display surface.

FIG. 5b depicts the following: Overlap region serves as the high-resolution display where sub-pixel overlap defines pixels in high-resolution space. Projector $P_1$ serves as the base reference frame. Homography H relates pixels in projector frame 2 to frame 1. The 2-D discrepancy can be calculated as the difference in position between pixels in $P_1$ and corresponding pixels in $P_2$.

An example experimental setup is shown in FIG. 6 at 100. The projectors, P1 and P2, with frustums, S1 and S2, overlap and form the Framebuffer Optique (R) whose pixels are defined by the overlap and the relative shift of the component projectors $H_c^{P1}$ and $H_c^{P2}$ are the planar projective transforms between each projector and a camera C obtained during a calibration phase. One of the projectors can be selected as the reference projector. The other rendering elements are related to this reference frame via a general planar projective relation derived during calibration. This projective relationship between the display elements can be written as a 3×3 homography. After the decomposition process, the component images are rendered by P1 and P2 and superimposed to achieve the superimposed image. Thus, as shown and labeled here by way of example, in deriving a set of component images, each projector, $P_i$, is calibrated to the reference frame, R, to determine the relative sub-pixel shift.

One again as mentioned, FIG. 7 is a high-level depiction in flow-diagram format of a technique 70 of the invention. As mentioned, the focus of image reconstruction according to the invention is deriving an appropriate component image for each projector's framebuffer to be projected: The target image is decomposed into the shifted and sub-sampled image components. Component images are then manipulated so as to minimize the difference between the sum of the components and the target image. These primary steps are summarized below:

(1) Each projector is calibrated to the target reference frame in order to determine the relative sub-pixel shift between each projector and that (target reference) frame.
(2) Once calibrated, an initial set of component image estimates is derived using the known shifts and sub-sampling rates for each component.
(3) Given these initial estimates, a form of 'global optimization' is done by minimizing the difference between the sum of the components and the target image.

FIG. 8 is an image projected from a component projector depicting regional sub-components (here there are 10) of uniform 2-D disparity, white lines denote boundaries of uniform 2-D displacement. Each component from a projector is composed of a set of the sub-components, having been derived utilizing a 2-D linear shift matrix.

While certain representative embodiments, examples, and details have been shown merely for the purpose of illustrating the technique and an associated system and program code of the invention, those skilled in the art will readily appreciate that various modifications, whether specifically or expressly identified herein, may be made to any of the representative embodiments without departing from the novel teachings or scope of this technical disclosure. Accordingly, all such modifications are contemplated and intended to be included within the scope of the claims. Although the commonly employed preamble phrase "comprising the steps of" may be used herein in a method claim, applicants do not intend to invoke 35 U.S.C. §112 ¶6. Furthermore, in any claim that is filed herewith or hereafter, any means-plus-function clauses used, or later found to be present, are intended to cover at least all structure(s) described herein as performing the recited function and not only structural equivalents but also equivalent structures.

What is claimed is:

1. A method for projecting a superimposed image onto a target display surface under observation of at least one camera, the method comprising the steps of:
   (a) determining a projective relationship between each of a plurality of projectors and the target display surface;
   (b) estimating a component image for each said projector, comprising:
      (1) using said projective relationship, for each of said component images determine a plurality of sub-sampled, regionally shifted images represented in the frequency domain; and
      (2) composing each said component image using a respective plurality of said sub-sampled, regionally shifted images; and
   (c) minimizing the difference between a sum of said component images and a frequency domain representation of a target image to produce a second component image for each said projector.

2. The method of claim 1 wherein said step of minimizing the difference between said sum and said frequency domain representation of said target image comprises: (a) identifying a second set of frequency domain coefficients for use in producing a frequency domain representation of said second component image for a respective one of said projectors, and (b) taking the inverse Fourier transform of said frequency domain representation of said second component image for said respective one of said projectors; and further comprising the step of projecting from each said projector, a respective one of said second component images to produce the superimposed image.

3. The method of claim 1 wherein said step of determining a projective relationship further comprises:
   (a) observing the target display surface with the camera, c;
   (b) recovering a homography between each projector, pi, and the camera, $H_{pi}^{c}$, and
   (c) using said homography, $H_{pi}^{c}$, determine said projective relationship, $H_{pi}^{b}$, wherein b represents a reference frame for the target display surface.

4. The method of claim 2 wherein said step of using said projective relationship to determine said plurality of sub-sampled, regionally shifted images, comprises: (a) decomposing each said projective relationship, $H_{pi}^{b}$, into a linear shift matrix representing offsets between a respective of said projectors pi, and said reference frame b; and (b) using said linear shift matrix for said determining said plurality of sub-sampled, regionally shifted images associated with said respective of said projectors pi.

5. The method of claim 1 wherein said step of minimizing the difference between said sum and said frequency domain representation of said target image, $F_T[u, v]$, comprises:
   (a) minimizing the expression:

$$\left\| F_T[u, v] - \left( \sum_{i=0}^{k} F_\Delta^i[u, v] \right) \right\|^2$$

wherein k represents the total number of said plurality of projectors, said component image for each said projector is represented by $$F_\Delta^p[u, v] = \sum_{r=0}^{N} F_{\Delta r}[u, v],$$

and said sub-sampled, regionally shifted images represented in the frequency domain are represented by $F_{\Delta r}[u, v]$, to identify a second set of frequency domain coefficients for use in producing a frequency domain representation of said second component image for a respective one of said projectors; and
   (b) taking the inverse Fourier transform of said frequency domain representation of said second component image for said respective one of said projectors.

6. A system for projecting the superimposed image onto the target display surface, of claim 1, wherein: being projected from each said projector, is a respective one of said second component images to produce the superimposed image.

7. A method for projecting a superimposed image onto a target display surface under observation of at least one camera, the method comprising the steps of:
   (a) determining a projective relationship between each of a plurality of projectors and the target display surface;
   (b) estimating a component image for each said projector, comprising:
      (1) using said projective relationship, for each of said component images determine a plurality of sub-sampled, regionally shifted images represented in the frequency domain, and
      (2) composing each said component image using a respective plurality of said sub-sampled, regionally shifted images; and
   (c) performing an optimization using said component images and a frequency domain representation of a target image to produce a second component image for each said projector.

8. The method of claim 7 wherein:
   (a) said step of performing an optimization comprises minimizing the difference between a sum of said component images and said frequency domain representation of said target image, $F_T[u, v]$, to produce said second component image for each said projector; and
   (b) said step of determining a projective relationship further comprises:
      (1) observing the target display surface with the camera, c;
      (2) recovering a homography between each projector, pi, and the camera, $H_{pi}^{c}$; and
      (3) using said homography, $H_{pi}^{c}$, determine said projective relationship, $H_{pi}^{b}$, wherein b represents a reference frame for the target display surface.

9. The method of claim 8 wherein said step of performing an optimization comprises minimizing the difference between a sum of said component images and said frequency domain representation of said target image, $F_T[u, v]$, by minimizing the expression:

$$\left\| F_T[u, v] - \left( \sum_{i=0}^{k} F_\Delta^i[u, v] \right) \right\|^2$$

wherein k represents the total number of said plurality of projectors, said component image for each said projector is represented by $$F_\Delta^p[u, v] = \sum_{r=0}^{N} F_{\Delta r}[u, v],$$

and said sub-sampled, regionally shifted images represented in the frequency domain are represented by $F_{\Delta r}[u, v]$, to identify a second set of frequency domain coefficients for use in producing a frequency domain representation of said second component image for a respective one of said projectors.

10. A system for projecting the superimposed image onto the target display surface, of claim 7, wherein: being projected from each said projector, is a respective one of said second component images to produce the superimposed image.

11. A computer executable program code on a computer readable storage medium for projecting a superimposed image onto a target display surface under observation of at least one camera, the program code comprising:
 (a) a first program sub-code for determining a projective relationship between each of a plurality of projectors and the target display surface;
 (b) a second program sub-code for estimating a component image for each said projector, said second program sub-code comprising instructions for:
  (1) using said projective relationship, for each of said component images determine a plurality of sub-sampled, regionally shifted images represented in the frequency domain; and
  (2) composing each said component image using a respective plurality of said sub-sampled, regionally shifted images; and
 (c) a third program sub-code for minimizing the difference between a sum of said component images and a frequency domain representation of a target image to produce a second component image for each said projector.

12. The program code of claim 11 wherein said frequency domain representation of said target image as $F_T[u, v]$, and said third program sub-code comprises instructions for:
 (a) minimizing the expression:

$$\left\| F_T[u, v] - \left( \sum_{i=0}^{k} F_\Delta^i[u, v] \right) \right\|^2$$

wherein k represents the total number of said plurality of projectors, said component image for each said projector is represented by $$F_\Delta^p[u, v] = \sum_{r=0}^{N} F_{\Delta r}[u, v],$$

and said sub-sampled, regionally shifted images represented in the frequency domain are represented by $F_{\Delta r}[u, v]$, to identify a second set of frequency domain coefficients for use in producing a frequency domain representation of said second component image for a respective one of said projectors; and
 (b) taking the inverse Fourier transform of said frequency domain representation of said second component image for said respective one of said projectors.

13. A computer executable program code on a computer readable storage medium for projecting a superimposed image onto a target display surface under observation of at least one camera, the program code comprising:
 (a) a first program sub-code for determining a projective relationship between each of a plurality of projectors and the target display surface;
 (b) a second program sub-code for estimating a component image for each said projector, said second program sub-code comprising instructions for:
  (1) using said projective relationship, for each of said component images determine a plurality of sub-sampled, regionally shifted images represented in the frequency domain; and
  (2) composing each said component image using a respective plurality of said sub-sampled, regionally shifted images; and
 (c) a third program sub-code for performing an optimization using said component images and a frequency domain representation of a target image to produce a second component image for each said projector.

14. The program code of claim 13 wherein:
 (a) said third program sub-code comprises instructions for minimizing the difference between a sum of said component images and said frequency domain representation of said target image to produce said second component image for each said projector; and
 (b) said first program sub-code comprises instructions for, while observing the target display surface with the camera, c, recovering a homography between each projector, pi, and the camera, $H_{pi}^c$, and using said homography, $H_{pi}^c$, determining said projective relationship, $H_{pi}^b$, wherein b represents a reference frame for the target display surface.

* * * * *